United States Patent
Krueger

(10) Patent No.: US 7,061,683 B2
(45) Date of Patent: Jun. 13, 2006

(54) METHOD AND A DEVICE FOR THE COMBINATION OF A FIRST AND SECOND BEAM OF RAYS

(75) Inventor: Ralf Krueger, Butzbach/Hochweisel (DE)

(73) Assignee: Leica Microsystems Wetzlar GmbH, Wetzlar (DE)

( * ) Notice: Subject to any disclaimer, the term of this patent is extended or adjusted under 35 U.S.C. 154(b) by 0 days.

(21) Appl. No.: 10/491,457

(22) PCT Filed: Oct. 10, 2002

(86) PCT No.: PCT/EP02/11337

§ 371 (c)(1),
(2), (4) Date: Apr. 1, 2004

(87) PCT Pub. No.: WO03/034097

PCT Pub. Date: Apr. 24, 2003

(65) Prior Publication Data

US 2004/0240049 A1    Dec. 2, 2004

(30) Foreign Application Priority Data

Oct. 12, 2001 (DE) .............................. 101 50 577

(51) Int. Cl.
*G02B 27/14* (2006.01)
(52) U.S. Cl. ..................................... 359/626; 359/636
(58) Field of Classification Search ................ 359/629, 359/634–636, 638–640, 834–835
See application file for complete search history.

(56) References Cited

U.S. PATENT DOCUMENTS

| 4,403,839 A | 9/1983 | Reichel ...................... 350/514 |
| 4,439,010 A | 3/1984 | Doty ........................... 350/174 |
| 5,270,804 A * | 12/1993 | Lach ........................... 359/640 |
| 6,459,490 B1 | 10/2002 | Kuhn et al. ................. 356/520 |

FOREIGN PATENT DOCUMENTS

FR    2468925    5/1981

OTHER PUBLICATIONS

Translation of previously submitted FR 2 468 925 (9 pages).

* cited by examiner

*Primary Examiner*—Alicia M Harrington
(74) *Attorney, Agent, or Firm*—Davidson, Davidson & Kappel, LLC

(57) ABSTRACT

A method for combining a first and a second ray bundle includes forming a first partial beam and a second partial beam by the first ray bundle interacting with a first beam-splitter layer, and forming a third partial beam and a fourth partial beam by the second ray bundle interacting with the first beam-splitter layer. The first, second, third and fourth partial beams are superimposed into an outgoing ray bundle by the first, second, third and fourth partial beams interacting with a second beam-splitter layer so that, in the outgoing ray bundle, the number of occurring reflections and transmissions of the first and second partial beams are basically the same as the number of occurring reflections and transmissions of the third and fourth partial beams.

19 Claims, 2 Drawing Sheets

METHOD AND A DEVICE FOR THE COMBINATION OF A FIRST AND SECOND BEAM OF RAYS

Figure 1:
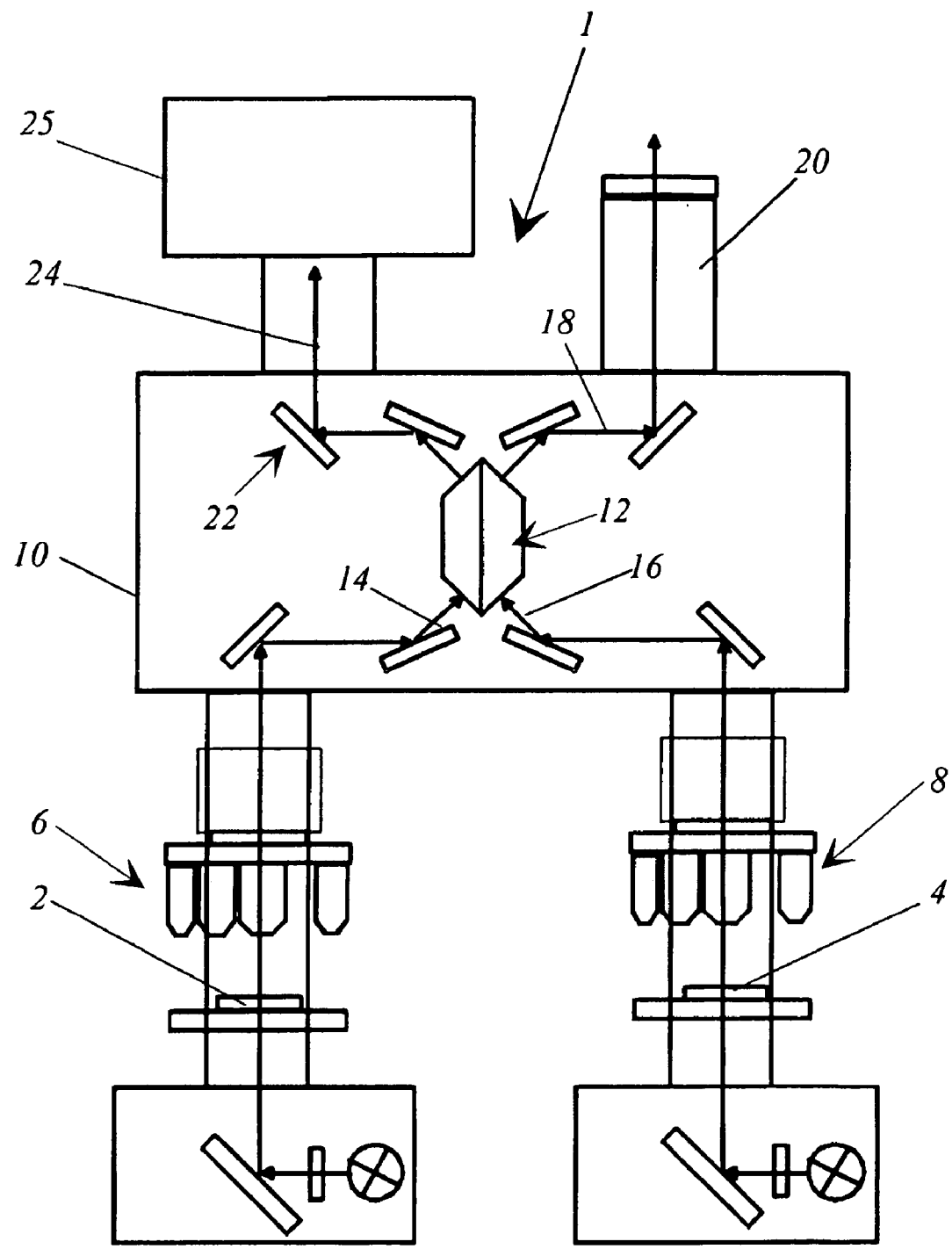

The present invention relates to a method and a device for combining a first and a second ray bundle, in particular, in an optical instrument for forensic comparative examination of a first and a second sample, the ray bundles interacting with a beam-splitter layer, forming first and second partial beams, and the partial beams being superimposed into a third, outgoing ray bundle.

BACKGROUND

When conducting forensic examinations to solve a crime, it is often necessary to compare the image of a first sample to the image of a second sample to obtain further details about the course of a crime.

Thus, for example, the impressions on cartridge cases caused by the firing pin of a weapon are compared to each other to determine whether the same weapon was used in two or more crimes.

Another known use of optical comparative examinations is to verify the authenticity of documents, in particular, of banknotes to ascertain whether they are forged.

Finally, to solve crimes, it is often necessary to compare fibers from clothes found at the crime scene to fibers from known pieces of clothing to be able to draw conclusions on the clothing worn by a perpetrator during a crime.

The applicant sells forensic comparison microscopes and comparison macroscopes, which are composed of two separate microscopes or separate macroscopes joined by a bridge, and which are suitable for performing the forensic comparative examinations mentioned above. The bridge contains a device which is used to combine the two separate images produced by the separate microscopes/macroscopes, and which is generally designed as a beam splitter known in optics for a long time. The two images of the separate microscopes/macroscopes to be compared are combined by the beam splitter in such a manner that, when viewed by the operator of the comparison microscope/macroscope through a shared tube mounted on the bridge, the two images are perceived as superimposed. By masking corresponding subareas of the two samples, a composite image is formed which allows direct comparison, for example, of one half-sample to the other half-sample.

Beam splitters which are used for both splitting and combining beams of light are described, for example, in "Bauelemente der Optik" [Optical Components], Taschenbuch für Konstrukteure [Handbook for Engineers], 4$^{th}$ revised edition, H. Naumann/G. Schröder, pp. 186 through 188.

The known comparison microscopes/macroscopes have the problem that, due to the design of the known beam-splitters in the tube, the perception of two separate images to be compared is not neutral in color, which makes it considerably more difficult to compare the two samples and, because of the missing or at least very limited color information, also unnecessarily reduces the reliability with which two probes can be identified.

SUMMARY OF THE INVENTION

It is therefore an object of the present invention to provide a method and a device which make it possible to produce an essentially color-neutral, superimposed image when superimposing two separate images to be compared, in particular, in a comparison microscope or comparison macroscope for forensic examinations.

A further object of the present invention is to provide an optical instrument for forensic comparative examination of a first and a second sample which produces an essentially color-neutral, superimposed image of the first and second sample.

In a method according to the present invention for combining a first and a second ray bundle, in particular, in an optical instrument for forensic examination of samples, the ray bundles are caused to interact with a beam-splitter layer; each of the first and second ray bundles both being reflected at the beam-splitter layer and passing therethrough. Subsequently, the first and second partial beams resulting from transmission and reflection of the first and second ray bundles are each caused to interact with a further beam-splitter layer such that the partial beams of the first and second ray bundles resulting from reflection and transmission at the beam-splitter layer interact once more with the further beam-splitter layer before they are combined into an outgoing third ray bundle.

In the case of the first partial beam of the first ray bundle, this results in a reflection, followed by a transmission; and in the case of the second partial beam, this results in an initial transmission, followed by a reflection. In contrast, in the case of the first partial beam of the second ray bundle, first a reflection occurs, followed by a further reflections, and in the case of the second partial beam, a transmission occurs, followed by a further transmission at the beam-splitter layer or further beam-splitter layer. Accordingly, in the outgoing third ray bundle, the sum of the reflections and transmissions of the partial beams of the first ray bundle, which amount to a total of 2 each, is equal to the sum of reflections and transmissions of the partial beams of the second ray bundle.

Since, according to the present invention, the first and second ray bundles interact with the beam-splitter layer and the further beam-splitter layer twice in succession before they are combined into an outgoing third ray bundle, in the outgoing third ray bundle, the number or sum of occurring reflections and transmissions of the first and second partial beams of the first ray bundle is essentially the same as the number of occurring reflections and transmissions of the first and second partial beams in the incoming second ray bundle.

The method according to the present invention has the advantage of being almost free of color errors which, in the prior art beam splitters having only one beam-splitter layer, for example, in the form of an interference layer or, in the simplest case, a semitransparent mirror, are caused by differences in the transmission and reflection coefficients of the beam-splitter layers and a physical wavelength dependency thereof.

In the preferred embodiment of the present invention, the beam-splitter layer has opposite first and second reflective surfaces running essentially parallel to each other; the first ray bundle striking the first reflective surface at a first point of interaction, and the second ray bundle striking the second reflective surface at a second point of interaction.

The beam-splitter layer is preferably a beam-splitter layer of the prior art which is produced in known manner and composed, for example, of a plurality of metallic and dielectric films. The body element is made, for example, of BAK 4® (a glass type of the Schott Company); the first and second reflective surfaces being deposited thereon in the form of a metallic silver coating, for example, by vapor deposition. However, the beam-splitter layer can also be any other beam-splitter layer known from the prior art.

In order to obtain as symmetrical an arrangement as possible with the smallest possible aberrations, the first point of interaction and the second point of interaction are located substantially at the same position on opposite sides of the beam-splitter layer.

Similar to the beam-splitter layer, the further beam-splitter layer also has opposite first and second reflective surfaces running essentially parallel to each other. In this connection, the further beam-splitter layer is preferably arranged in such a manner that the first partial beam of the first ray bundle resulting from reflection strikes the first reflective surface at a third point of interaction, and the second partial beam of the second ray bundle resulting from reflection strikes the second reflective surface of the further beam-splitter layer at a fourth point of interaction; the third point of interaction and the fourth point of interaction being located substantially at the same position on opposite sides of the further beam-splitter layer in order to minimize aberrations.

In an embodiment of the present invention, the first partial beam of the first ray bundle resulting from reflection at the beam-splitter layer and the second partial beam of the second ray bundle resulting from transmission at the beam-splitter layer are deflected toward the third point of interaction by total reflection at a third reflective surface after interaction with the beam-splitter layer.

Preferably in the same way, the second partial beam of the first ray bundle resulting from transmission and the first partial beam of the second ray bundle resulting from reflection are deflected toward the fourth point of interaction, also by total reflection at a fourth reflective surface after interaction with the beam-splitter layer. The third and fourth reflective surfaces are preferably formed by the unmirrored lateral faces of a prism that run parallel to the beam-splitter layer and to the further beam-splitter layer. Because of this, the reflection of the partial beams is essentially color-neutral compared to a reflection of the partial beams at a vapor deposition mirror reflective surface, which would also be conceivable. The angle at which the aforementioned partial beams strike the third and fourth reflective surfaces, and preferably also the further beam-splitter layer, is preferably around 45°, just as the angle of incidence of the first and second incident ray bundles with respect to the beam-splitter layer. This provides an optical path which is easy to implement and allows imaging with very good color neutrality.

In this embodiment of the present invention, both the reflectivity and transmissivity of the beam-splitter layer and of the further beam-splitter layer are essentially the same, resulting in a combination of ray bundles which has very good color neutrality. In this connection, it is particularly advantageous if the beam-splitter layer and the further beam-splitter layer are formed by one and the same beam-splitter layer so that the incoming first and second ray bundles and the partial beams resulting therefrom by transmission and reflection after the first interaction with the beam-splitter layer once more interact with the same beam-splitter layer are combined by the same beam-splitter layer into the third, outgoing ray bundle at the fourth point of interaction. In this manner, it can be ensured that the reflectivity and transmissivity of the beam-splitter layers are largely the same for the incoming ray bundles and for the partial beams, thus preventing a reduction in color neutrality due to production tolerances.

If, due to production conditions, a beam-splitter layer having a splitting ratio of 50/50, has a transmissivity of, for example, 45% and a reflectivity of 55% for a specific wavelength, then the color separation of 45/55 of the prior art is reduced to 49.5/50.5 by the method of the present invention.

This can be attributed to the fact that in the case of the first incoming ray bundle, the reflected and transmitted portion contained in the outgoing third ray bundle is 55%*45%+45%*55%=49.5% whereas the reflected and transmitted portion of the second incoming ray bundle contained in the outgoing third ray bundle amounts to 55%*55%+45%*45%=50.5%. Using the method according to the present invention, the color separation between the first and second incoming ray bundles in the combined, outgoing third ray bundle can therefore be improved by a factor of 10 compared to a prior art beam splitter having only one beam-splitter layer.

When speaking of "combining two ray bundles into a third, outgoing ray bundle" in connection with the method described above and the device for carrying out the method which will be described below, the reverse beam path, in which an incoming third ray bundle is split into two outgoing first and second ray bundles, is also included. Such a splitting of a ray bundle into two further ray bundles is used, for example, in microscopes to feed a partial image of the object that is visible in the eyepiece to a digital image recording system for documentation purposes. The advantages of the present invention, in particular, good color neutrality, also apply to these methods and devices for splitting an incoming ray bundle or image into two outgoing ray bundles (beam splitters).

In a further embodiment of the idea underlying the present invention, a device for combining a first and a second ray bundle or image includes a beam-splitter layer with which the first and second ray bundles interact, forming first and second partial beams, which are superimposed into a third, outgoing ray bundle. In addition to this, a further beam-splitter layer is provided with which the first and second partial beams of the first and second ray bundles, upon interaction with the (first) beam-splitter layer, interact once more such that, in the outgoing third ray bundle, the number of occurring reflections and transmissions of the first and second partial beams of the first and second ray bundles is essentially the same.

The beam-splitter layer and the further beam-splitter layer are preferably designed as described in connection with the method of the present invention, and have opposite first and second reflective surfaces running essentially parallel to each other; the first ray bundle striking the first reflective surface at a first point of interaction, and the second ray bundle striking the second reflective surface at a second point of interaction.

Similarly, the further beam-splitter layer has opposite first and second reflective surfaces running essentially parallel to each other, on which the first partial beam of the first ray bundle resulting from reflection is incident at a third point of interaction, and the second partial beam of the second ray bundle resulting from reflection is incident at a fourth point of interaction on opposite sides.

According to a particularly advantageous embodiment of the present invention, the first partial beam of the first ray bundle resulting from reflection at the beam-splitter layer and the second partial beam of the second ray bundle resulting from transmission through the beam-splitter layer are deflected toward the third point of interaction by total reflection at a third reflective surface after interaction with the beam-splitter layer.

Similarly, the second partial beam of the first ray bundle resulting from transmission at the first beam-splitter layer and the first partial beam of the second ray bundle resulting from reflection are deflected toward the fourth point of interaction by total reflection at a fourth reflective surface after interaction with the beam-splitter layer. Due to the deflection of the partial beams by total reflection at the third and fourth reflective surfaces, a beam splitter is provided that is compact and inexpensive to manufacture, and which can be used, with good color neutrality, both to combine two ray bundles and to split an incoming ray bundle into two outgoing ray bundles.

According to an embodiment of the present invention, the beam-splitter layer and the further beam-splitter layer are formed by a single continuous beam-splitter layer. The device according to the present invention is preferably composed of two subprisms having trapezoidal bases and lateral faces which run at right angles to the trapezoidal bases and are joined in the region of the long lateral face, preferably using optical cement. The beam-splitter layer and the further beam-splitter layer are applied to the long lateral face of one of the subprisms, for example, by vapor deposition or also with optical cement, prior to joining the two subprisms so that the (in this case) continuous beam-splitter layer is located in the area of the junction of the two subprisms. The subprisms are preferably made of glass, but can also be manufactured from plastic or another suitable material.

In this embodiment of the present invention, the third and fourth reflective surfaces are each formed by the short lateral face which is opposite and parallel to the long lateral face of the respective subprism. The remaining two lateral faces are preferably arranged at an angle of 45° to the two lateral faces mentioned above. A first and a second lateral face of these lateral faces arranged at an angle of 45° are used as surfaces of incidence for the first and second incoming ray bundles, and a third lateral face constitutes an exit surface for the third, outgoing ray bundle.

According to another embodiment, the remaining fourth lateral face of the subprisms, which is arranged at an angle, can be used as an exit surface for a further outgoing ray bundle which, for example, in the case of comparison microscopes or comparison macroscopes, is fed via a suitable imaging system to, in the simplest case, a still camera, but preferably to a digital recording and processing system for documentation purposes.

Because of this, the device according to the present invention advantageously allows a further, essentially color-neutral composite image to be coupled out of the optical path for documentation purposes without the use of an additional beam splitter.

In a further embodiment of the present invention, the device described above is used in an optical instrument for forensic comparative examination of a first and a second sample, in which the inventive device receives a first image of the first sample in the form of a first ray bundle through first imaging optics and a second image of the second sample in the form of a second ray bundle through second imaging optics for combined representation.

According to an embodiment of the present invention, the first imaging optics and the second imaging optics are formed by a first and a second microscope, and the device for combining the two images is accommodated in a bridge joining the microscopes.

In this embodiment of the present invention, it can also be advantageous if the bridge has mounted thereon and connected thereto a shared tube through which the combined first and second images can be viewed in the form of a third, outgoing ray bundle.

Finally, the optical instrument can contain a further imaging system which allows a further image, which is composed of the combined first and second images, to be coupled out of the inventive device for combining the first and second images in the form of a fourth ray bundle for documentation purposes.

Figure 2:
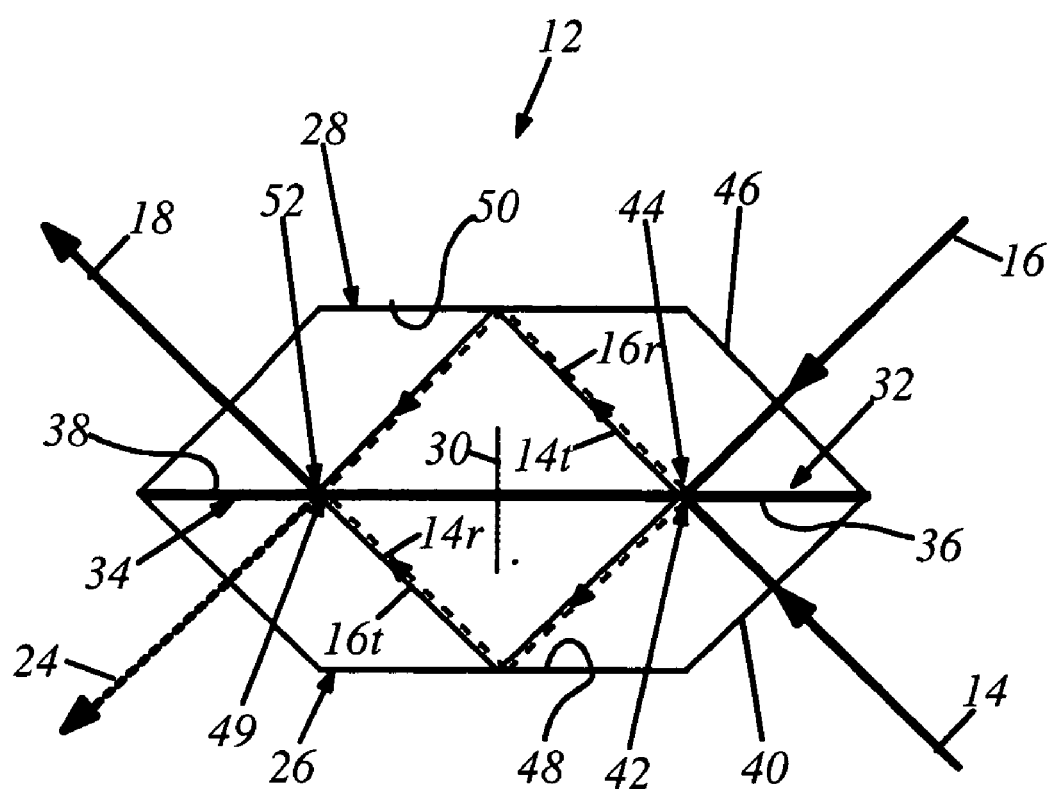

In the following, the present invention is described by way of examples with reference to the drawings, in which:

FIG. 1 shows an optical instrument according to the present invention in the form of a comparison microscope containing an inventive device for combining two ray bundles for forensic comparative examination of a first and a second sample; and FIG. 2 is a schematic detail view of the inventive device for combining a first and a second ray bundle into a third ray bundle and, in the case of a reverse optical path, for splitting a third, incoming ray bundle into a first and second outgoing ray bundle.

DETAILED DESCRIPTION

As shown in FIG. 1, an optical instrument 1 according to the present invention for forensic comparative examination of a first sample 2 and a second sample 4 includes first imaging optics in the form of a first microscope 6 and second imaging optics in the form of a second microscope 8, the microscopes being joined by a bridge 10 which accommodates an inventive device 12 which is also referred to as "beam splitter" and combines a first image of first sample 2 in the form of a first incoming ray bundle 14 and an image of second sample 4 which is in the form of a second incoming ray bundle 16 and is to be compared to the image of the image of the first sample; the inventive device 12 imaging this combined image for combined representation in the form of a third ray bundle 18 in a tube 20 mounted on bridge 10.

As further shown in FIG. 1, the optical instrument 1 according to the present invention also includes a further, schematically shown optical imaging system 22 which is composed of deflection mirrors (not further detailed) and allows a further image, which is composed of the combined first and second images, to be coupled out of the device 12 for combining the first and second images in the form of a fourth ray bundle 24 for documentation with a camera 25; the deflection mirrors being drawn only schematically for reasons of representation.

FIG. 2 is a detail view of the device 12 according to the present invention for combining first ray bundle 14 and second ray bundle 16.

As can be seen from FIG. 2, the device 12 according to the present invention for combining first and second ray bundles 14, 16 includes a first and a second subprism 26 and 28 between which is provided an optical beam-splitter layer having a first reflective surface 36 and a second reflective surface 38; the beam-splitter layer being divided by imaginary dividing line 30 into a first beam-splitter layer 32 and a further beam-splitter layer 34 for better understanding.

Upon entering the first subprism 26 through the substantially planar entrance surface 40, the first incoming ray bundle 14 strikes the first reflective surface 36 of beam-splitter layer 32 at a first point of interaction 42 where the first ray bundle 14 is split into a first partial beam 14r resulting from reflection at first reflective surface 36 and a second partial beam 14*t* which results from transmission and passes through beam-splitter layer 32.

Similarly, at the second reflective surface 38 of beam-splitter layer 32, the second incoming ray bundle 16, which enters second subprism 28 through the substantially planar entrance surface 46, is split at a second point of interaction 44 into a first partial beam 16*r* resulting from reflection and a second partial beam 16*t* resulting from transmission through beam-splitter layer 32.

Upon interaction with beam-splitter layer 32, the first partial beam 14*r* of first ray bundle 14 resulting from reflection and the second partial beam 16*t* of second ray bundle 16 resulting from transmission are deflected, preferably by total reflection at a third reflective surface 48, toward a third point of interaction 49 where they simultaneously strike first reflective layer 36 of further beam-splitter layer 34; one part passing through the reflective layer and the other part being reflected. The portion of the two partial beams which is reflected at third point of interaction 49 constitutes a part of the fourth, outgoing ray bundle 24 which can be fed to a camera 25 for documentation purposes (FIG. 1).

Similarly, upon interaction with beam-splitter layer 32, the second partial beam 14*t* of first ray bundle 14 resulting from transmission and the first partial beam 16*r* of second ray bundle 16 resulting from reflection are deflected by total reflection at a fourth reflective surface 50 toward a fourth point of interaction 52 where they simultaneously strike second reflective layer 38 of further beam-splitter layer 34; one part passing through the reflective layer and the other part being reflected. In the process, the portion of the two partial beams 16*r* and 14*t* which is reflected at fourth point of interaction 52 is superimposed with the portion of partial beams 14*r* and 16*t* which passed through the further beam-splitter layer 34 in the region of third point of interaction 49 to form the outgoing third ray bundle 18 which is fed to tube 20 as shown in FIG. 1.

Finally, the portion of the two partial beams 16*r* and 14*t* which passed through the further beam-splitter layer 34 at fourth point of interaction 52 is superimposed with the portion of partial beams 14*r* and 16*t* which is reflected in the region of third point of interaction 49 to form the fourth, outgoing ray bundle 24.

LIST OF REFERENCE NUMERALS 1 optical instrument according to the present invention
2 first sample
4 second sample
6 first microscope
8 second microscope
10 bridge
12 device according to the present invention for combining two ray bundles/beam splitter
14 first incoming ray bundle
14*r* first partial beam obtained from the first ray bundle by reflection
14*t* second partial beam obtained from the first ray bundle by transmission
16 second incoming ray bundle
16*r* first partial beam obtained from the second ray bundle by reflection
16*t* second partial beam obtained from the second ray bundle by transmission
18 third, outgoing ray bundle
20 tube
22 further optical imaging system
24 fourth ray bundle
25 camera
26 first subprism
28 second subprism
30 imaginary dividing line
32 beam-splitter layer
34 further beam-splitter layer
36 first reflective surface
38 second reflective surface
40 entrance surface for the first ray bundle
42 first point of interaction
44 second point of interaction
46 entrance surface for the second ray bundle
48 third reflective surface
49 third point of interaction
50 fourth reflective surface
52 fourth point of interaction

What is claimed is:

1. A method for combining a first and a second ray bundle, comprising:
    forming a first partial beam and a second partial beam by the first ray bundle interacting with a first beam-splitter layer;
    forming a third partial beam and a fourth partial beam by the second ray bundle interacting with the first beam-splitter layer; and
    superimposing the first, second, third and fourth partial beams into an outgoing ray bundle by the first, second, third and fourth partial beams interacting with a second beam-splitter layer so that, in the outgoing ray bundle, a number of occurring reflections and transmissions of the first and second partial beams are substantially the same as a number of occurring reflections and transmissions of the third and fourth partial beams;
    wherein:
        the second beam-splitter layer has opposite third and fourth reflective surfaces running substantially parallel to each other;
        the first partial beam results from reflection and strikes the third reflective surface at a third point of interaction; and
        the third partial beam results from reflection and strikes the fourth reflective surface at a fourth point of interaction.

2. The method as recited in claim 1 wherein the combining of the first and second ray bundles occurs in an optical instrument for forensic examination of specimens.

3. The method as recited in claim 1 wherein:
    the first beam-splitter layer has opposite first and second reflective surfaces running substantially parallel to each other; and
    the first ray bundle strikes the first reflective surface at a first point of interaction, and the second ray bundle strikes the second reflective surface at a second point of interaction.

4. The method as recited in claim 3 wherein the first point of interaction and the second point of interaction are disposed at a substantially same relative position on opposite sides of the first beam-splitter layer.

5. The method as recited in claim 1 wherein the third point of interaction and the fourth point of interaction are disposed at a substantially same relative position on opposite sides of the second beam-splitter layer.

6. The method as recited in claim 1 wherein the fourth partial beam results from transmission and further comprising deflecting the first partial beam and the fourth partial beam toward the third point of interaction by total reflection at a fifth reflective surface after the respective interacting of the first and second ray bundles with the first beam-splitter layer.

7. The method as recited in claim 1 wherein the second partial beam results from transmission and further comprising deflecting the third partial beam and the second partial beam toward the fourth point of interaction by total reflection at a sixth reflective surface after the respective interacting of the first and second ray bundles with the first beam-splitter layer.

8. The method as recited in claim 1 wherein the first beam-splitter layer and the second beam-splitter layer includes a single continuous beam-splitter layer.

9. A method for combining a first and a second ray bundle, comprising:
   forming a first partial beam and a second partial beam by the first ray bundle interacting with a first beam-splitter layer;
   forming a third partial beam and a fourth partial beam by the second ray bundle interacting with the first beam-splitter layer; and
   superimposing the first, second, third and fourth partial beams into an outgoing ray bundle by the first, second, third and fourth partial beams interacting with a second beam-splitter layer so that, in the outgoing ray bundle, a number of occurring reflections and transmissions of the first and second partial beams are substantially the same as a number of occurring reflections and transmissions of the third and fourth partial beams;
   wherein:
      a respective reflectivity of the first beam-splitter layer and of the second beam-splitter layer are substantially the same; and
      a respective transmissivity of the first beam-splitter layer and of the second beam-splitter layer are substantially the same.

10. A device for combining a first and second incoming ray bundle, comprising:
   a first beam-splitter layer configured to receive a first and a second ray bundle so that the first and second ray bundles interact therewith so as to form a first and a second partial beam by the first ray bundle and a third and a fourth partial beam by the second ray bundle; and
   a second beam-splitter layer configured to receive the first, second, third and fourth partial beams so that the first, second, third and fourth partial beams interact so as to form an outgoing ray bundle via superposition of the first, second, third and fourth partial beams where, in the outgoing ray bundle, a number of occurring reflections and transmissions of the first and second partial beams are substantially the same as a number of occurring reflections and transmissions of the third and fourth partial beams;
   wherein:
      the second beam-splitter layer includes oppositely-disposed third and fourth reflective surfaces running substantially parallel to each other;
      the first partial beam results from reflection and strikes the third reflective surface at a third point of interaction; and
      the third partial beam results from reflection and strikes the fourth reflective surface at a fourth point of interaction.

11. The device as recited in claim 10 wherein:
   the first beam-splitter layer includes oppositely disposed first and second reflective surfaces running substantially parallel to each other; and
   the first beam-splitter layer is configured so that the first ray bundle strikes the first reflective surface at a first point of interaction and the second ray bundle strikes the second reflective surface at a second point of interaction.

12. The device as recited in claim 10 further comprising a fifth reflective surface configured to deflect the first partial beam and the fourth partial beam toward the third point of interaction by total reflection after the respective interacting of the first and second ray bundles with the first beam-splitter layer.

13. The device as recited in claim 10 further comprising a sixth reflective surface configured to deflect the third partial beam and the second partial beam toward the fourth point of interaction by total reflection after the respective interacting of the first and second ray bundles with the first beam-splitter layer.

14. The device as recited in claim 10 wherein the first beam-splitter layer and the second beam-splitter layer include a single continuous beam-splitter layer.

15. The device as recited in claim 10 wherein the device is included in an optical instrument for forensic comparative examination of a first and a second sample via combined representation of a first image of the first sample and a second image of the second sample, the optical instrument further including first imaging optics configured to provide the first image as the first ray bundle and second imaging optics configured to provide the second image as the second ray bundle.

16. A device for combining a first and second incoming ray bundle, comprising:
   a first beam-splitter layer configured to receive a first and a second ray bundle so that the first and second ray bundles interact therewith so as to form a first and a second partial beam by the first ray bundle and a third and a fourth partial beam by the second ray bundle; and
   a second beam-splitter layer configured to receive the first, second, third and fourth partial beams so that the first, second, third and fourth partial beams interact so as to form an outgoing ray bundle via superposition of the first, second, third and fourth partial beams where, in the outgoing ray bundle, a number of occurring reflections and transmissions of the first and second partial beams are substantially the same as a number of occurring reflections and transmissions of the third and fourth partial beams;
   wherein the first beam-splitter layer and the second beam-splitter layer include a single continuous beam-splitter layer; and
   wherein the single continuous beam-splitter layer includes an area of a junction of a first and a second subprism, the first and second subprisms each having a substantially trapezoidal cross-section.

17. An optical instrument for forensic comparative examination of a first and a second sample via combined representation of images of first and second samples, comprising:
   first imaging optics configured to provide a first image of a first sample as a first ray bundle;
   second imaging optics configured to provide a second image of a second sample as a second ray bundle; and
   a device for combining the first and second ray bundles, the device including:
      a first beam-splitter layer configured to receive the first and second ray bundles so that the first and second ray bundles interact therewith so as to form a first and a second partial beam by the first ray bundle and a third and a fourth partial beam by the second ray bundle; and a second beam-splitter layer configured to receive the first, second, third and fourth partial beams so that the first, second, third and fourth partial beams interact so as to form an outgoing ray bundle via superposition of the first, second, third and fourth partial beams where, in the outgoing ray bundle, a number of occurring reflections and transmissions of the first and second partial beams are substantially the same as a number of occurring reflections and transmissions of the third and fourth partial beams;

wherein the first imagine optics includes a first microscope and the second imaging optics includes a second microscope, and further comprising a bridge configured to join the first and second microscopes, the device for combining being disposed on the bridge.

18. The optical instrument as recited in claim 17 further comprising a shared tube connected to the bridge, the first and second images being perceivable by the human eye through the shared tube as a combined image.

19. The optical instrument as recited in claim 17 further comprising an imaging system configured to couple out, for documentation purposes, a further image including a combination of the first and second images.

* * * * *